(No Model.)

R. L. BROOKS.
ATTACHMENT FOR ANIMAL TRAPS.

No. 533,524. Patented Feb. 5, 1895.

Witnesses
Alfred W. Kenaston.
A. M. Mackay

Inventor
Roy L Brooks
by J. M. Pollard
Attorney

UNITED STATES PATENT OFFICE.

ROY L. BROOKS, OF MEMPHIS, TENNESSEE.

ATTACHMENT FOR ANIMAL-TRAPS.

SPECIFICATION forming part of Letters Patent No. 533,524, dated February 5, 1895.

Application filed June 20, 1894. Serial No. 515,116. (No model.)

*To all whom it may concern:*

Be it known that I, ROY L. BROOKS, a citizen of the United States, residing at Memphis, Shelby county, Tennessee, have invented a new and useful Attachment for Animal-Traps, which I have named a Bait-Holder, of which the following is a specification.

My invention relates to that class of traps which require a bait or lure to attract the animal that it is intended to capture and the objects of said invention are to provide an attachment by means of which the bait can be readily and securely attached to the trap, or elsewhere when so designed, and that can be so attached in the absence of light, and almost instantly as regards the time required and that can be manipulated while the hands are covered with thick gloves or mittens or even when the hands are so benumbed by cold as to be partially useless.

My invention is specially designed for the use of trappers in cold countries and such as usually employ a large number of traps scattered over a wide region of country. These traps are usually visited each day, rebaited and looked after carefully, and even a minute or two of time saved in the attention given to each trap becomes a matter of great importance where hundreds of traps in a circuit are to be visited in each day and baits attached or adjusted to such as have been disturbed, and where as often happens much of this work has to be done at night or in the absence of daylight, and when benumbed by long exposure and cold.

My invention consists in a device to which the bait is securely attached and which may then be attached to a trap. In practice a large number of these would be baited, as for instance in a trapper's cabin and at night or in inclement weather and these prepared bait holders would be substituted for those requiring fresh bait as the traps were successively visited.

Figure 1:
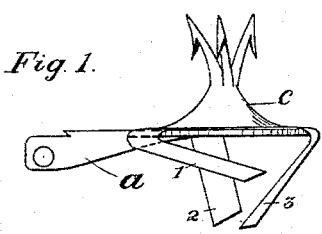
Figure 2:
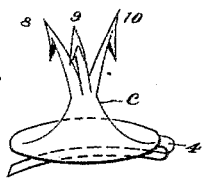
Figure 3:
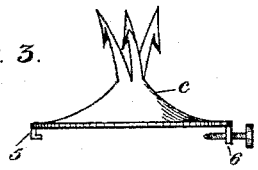
Figure 4:
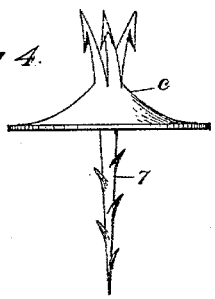

In the drawings Figure 1 is a side elevation of the trigger plate *a* of a steel trap showing the bait holder *c* partly attached; Fig. 2, a bait holder of modified construction in perspective; Fig. 3, a side elevation of still another modification; Fig. 4, a side elevation of a fourth modification.

As shown in Fig. 1 the bait holder consists of a light base plate *c* having three barbed points extending upwardly from its surface and having attached to its edges at equidistant points three strips of soft non elastic metal as for instance of thin copper capable of almost indefinite bending and straightening. The bait is attached by pressing it upon the barbed points and the bait holder is then secured to the part *a* of the trap by bending the metal strips 1, 2, 3 beneath and up against the foot plate.

In Fig. 2 I illustrate a device similar to that shown in Fig. 1 but instead of the soft metal clasps I employ a stiff spring 4. The bait is attached as before explained and the bait holder is secured to the trap by slipping the foot plate edgewise between the spring and base plate of the bait holder.

A still more secure attachment is shown in Fig. 3, in which a clamp 5 and screw 6 are employed to lock the bait holder in place the arrangement being identical with that employed in holding gas fixture shades in position.

Fig. 4 illustrates a bait holder that is not to be attached to a trap but may be thrust into the ground or into a tree or post in the vicinity of the trap as this is in some instances preferable.

In explanation of Fig. 4 it may be stated that for some animals the bait employed is merely an essential oil or some form of musk the animals being attracted by the scent. In such cases my device is to be used as follows: The bait is a small piece of sponge or flannel saturated with the substance employed to attract the animal and attached to the bait holder by affixing it to the barbs as in Fig. 4. With beaver and some other fur bearing animals the bait should be inaccessible being best arranged immediately above the trap and out of reach and this is easily accomplished by thrusting the sharp point of the barbed pike 7 into a tree or post and setting the trap immediately beneath it.

Many other modifications of my invention may be devised but I have shown sufficient to give any one skilled in the art a full knowledge of the scope and intent of my invention and such modifications as may be best for any special form of trap or best adapted for the capture of any particular game or animal will readily suggest themselves to an experienced trapper.

The device is light and portable and a hundred or more of these prepared bait holders may easily be carried in a small haversack so that a trapper having a sufficient number prepared and baited will be enabled to attend to a greater number of traps and to cover more territory as there will be little delay in rebaiting. This can also be accomplished in weather so inclement that it would be almost impossible under any of the old methods.

Having now described my invention, I claim—

1. A separable bait holder for animal traps comprising a suitable base having bait retainers thereon, and means for securing the holder in position.

2. A bait holder having the base $c$, barbed teeth or points 8, 9 and 10 whereby the bait may be held, and a spring 4 whereby the bait holder may be secured to the trap.

ROY L. BROOKS.

Witnesses:
A. N. GUNNISON,
R. G. CRAIG.